United States Patent [19]

Ethen

[11] 4,282,281
[45] Aug. 4, 1981

[54] LONG-LIVED HEAVY-DUTY PAVEMENT MARKING

[75] Inventor: John L. Ethen, Oakdale, Minn.

[73] Assignee: Minnesota Mining and Manufacturing Company, St. Paul, Minn.

[21] Appl. No.: 90,571

[22] Filed: Nov. 2, 1979

[51] Int. Cl.³ .................. B32B 5/16; B32B 27/20
[52] U.S. Cl. .................................. 428/149; 156/71; 404/12; 427/137; 428/325; 428/337; 428/406; 428/521
[58] Field of Search ............. 428/325, 406, 913, 337, 428/54, 522, 521, 149; 427/137, 163; 404/14, 20, 32, 72, 94, 9; 260/42, 47; 156/71

[56] References Cited

U.S. PATENT DOCUMENTS

| | | | |
|---|---|---|---|
| 3,782,843 | 1/1974 | Eigenmann | 404/9 |
| 3,915,771 | 10/1975 | Gatzke et al. | 428/325 |
| 3,930,100 | 12/1975 | McDonald | 404/32 |
| 3,935,365 | 1/1976 | Eigenmann | 428/325 |
| 4,117,192 | 9/1978 | Jorgensen | 428/337 |

*Primary Examiner*—Paul J. Thibodeau
*Attorney, Agent, or Firm*—Cruzan Alexander; Donald M. Sell; Roger R. Tamte

[57] ABSTRACT

Longer-lived pavement markings are provided by adhering to the pavement a sheet material about one-fourth millimeter or more thick that comprises a carboxyl-modified acrylonitrile-butadiene polymer and particulate fillers dispersed in the polymer.

10 Claims, 1 Drawing Figure

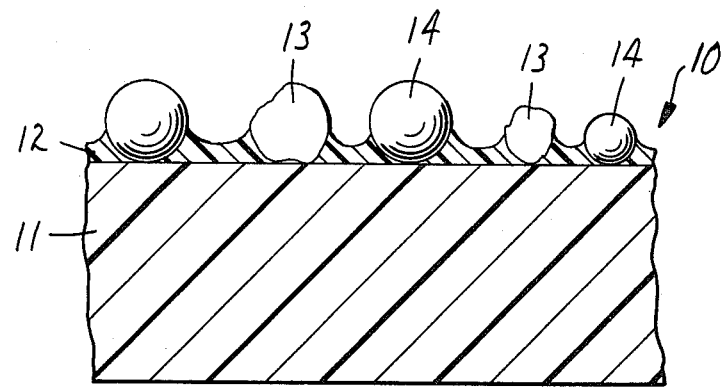

LONG-LIVED HEAVY-DUTY PAVEMENT MARKING

Pavement-marking sheet material described in Jorgensen, U.S. Pat. No. 4,117,192, has particular utility in the pavement-marking industry because, in comparison to painted lines and other pavement-marking sheet materials, it provides long life in heavy-wear locations. Usage of such sheet material, as for crosswalk or stop-bar markings at intersections, has grown rapidly.

However, pavement markings of even longer useful life and durability are desired, in view of the extreme conditions of abrasion and wear that the markings experience on a roadway, and in view of the competing need for the markings to remain clearly visible for traffic-control purposes.

The present invention is based on sheet material described in the Jorgensen patent, but provides a pavement-marking sheet material of significantly increased life. Briefly, this new pavement-marking sheet material comprises a polymer-based sheet that is about one-fourth millimeter or more thick and that comprises at least 8 weight-percent of an acrylonitrile-butadiene polymer carrying at least 2 weight-percent (based on the weight of the polymer) of carboxyl groups, and particulate fillers dispersed in the polymer. Preferably the sheet material is made retroreflective by inclusion of glass microspheres, which may be either or both dispersed in the polymer-based sheet and adhered to the top of the polymer-based sheet. Preferably, also, coupling agents such as aminosilanes having an inorganophilic portion and an organophilic portion are included at the interface between the microspheres and the matrix in which they are supported to improve retention of the microspheres in the sheet material. This coupling agent can be coated on the microspheres or added to the ingredients from which the sheet material is formed.

Although the full reasons for the improved life of pavement-marking sheet material of the invention are not known, it is theorized that the carboxyl sites on the acrylonitrile-butadiene polymer cause the polymer to develop stronger bonding forces toward the particulate filler dispersed in the polymer than the previously used non-reactive polymer develops, and that as a result the internal strength and integrity of the sheet material is increased. Whatever the reasons, initial testing of the sheet material indicates a significantly increased useful life.

DETAILED DESCRIPTION

The invention can be illustrated by the following example. The ingredients listed below were compounded and calendered into a sheet about 1.2 millimeter thick.

| | Parts by Weight |
|---|---|
| Carboxyl-modified acrylonitrile-butadiene elastomer precursor having 5 weight-percent carboxyl functionality ("Hycar 1072" supplied by B. F. Goodrich) | 13.53 |
| Chlorinated paraffin (a mixture of "Chlorowax 70-S" and "Chlorowax 40" in a weight ratio of 9.47 parts to 2.03 parts, said resins being supplied by Diamond Shamrock) | 11.5 |
| Titanium dioxide pigment ("Tipure R960" supplied by duPont) | 17.59 |
| Ultramarine blue pigment | 0.07 |
| Asbestos ("Calidria RG-100") | 16.24 |
| Stearic acid | 0.48 |
| Hydrated silica ("HiSil 233") | 2.71 |
| Glass microspheres averaging 200 micrometers in diameter treated with 550 parts per million of an aminosilane (Union Carbide's "A-1100") | 37.89 |

A 6-inch-wide tape was cut from the sheet, and a polychloroprene-based contact cement was applied with a paint roller to both the surface of a paved roadway and one surface of the tape. The tape was pressed against the roadway to form a marking across the width of the roadway. A tape as described in Jorgensen, U.S. Pat. No. 4,117,192, was adhered to the roadway side-by-side with the tape of the example. When observed at intervals during a 7-month period that extended over a winter, portions of the patented tape appeared to be worn away about twice as fast as the tape of the example.

The acrylonitrile-butadiene polymer may be thought of as an elastomer-precursor, i.e., an ingredient that may be vulcanized or cured to form an elastomer (an "elastomer" is regarded herein as a material that can be stretched at room temperature to at least twice its original length, and after having been stretched and the stress removed, returns with force to approximately its original length in a short time). However, leaving the acrylonitrile-butadiene elastomer-precursor unvulcanized in sheet material of the invention provides a desired flowability or deformability to the sheet material. The deformability of the sheet material can be further promoted by the inclusion of extender resins such as chlorinated paraffins, hydrocarbon resins, or polystyrenes.

The acrylonitrile-butadiene polymer preferably accounts for at least about one-third and more preferably at least one-half by weight of the polymeric ingredients in the polymer-based sheet, and preferably accounts for at least 10 weight-percent of the total ingredients in the sheet.

Asbestos as well as various pigments have been used in sheet material of the invention to provide good durability. Other sorts of particulate or fibrous fillers may also be used, such as clay, talc, wood flock, or glass fiber. These fillers improve the physical properties of the sheet material, and as indicated above, the reactive acrylonitrile-butadiene polymer is believed to have improved bonding to the filler, thereby further improving the internal strength of the sheet material. When glass microspheres are included in the polymer-based sheet, they also function as a filler. The amount of particulate fillers (including glass microspheres, if present) will vary with the kind of fillers and polymeric ingredients, but generally the fillers will account for between about one-third and three-fourths of the volume of the polymer-based sheet. Preferably, the polymeric ingredients account for at least one-third by volume of the polymer-based sheet.

The polymer-based sheet in sheet material of the invention is preferably at least about one-fourth millimeter thick, and more preferably at least about one millimeter thick, but generally is less than about two or three millimeters thick.

A support film of the type described in Jorgensen, U.S. Pat. No. 4,117,192, may be adhered to the polymer-based sheet to provide a support for particulate material such as glass microspheres. The microspheres are partially embedded in, and partially exposed above, the support film, and thereby provide immediate reflectivity to the sheet material. The microspheres are typically scattered randomly in the support film in amount sufficient to provide measurable reflectivity. Additional reflectivity is provided as the sheet material wears, by inclusion of glass microspheres dispersed within the polymer-based sheet. Such microspheres can become exposed at the surface of the sheet and substitute for microspheres removed when the support film is worn away.

The support film is generally more elastic than the polymer-based sheet, meaning that upon application and then release of deforming stress it will return more closely to its original shape. The result is that microspheres can be held on the surface of the sheet material. Skid-resisting particles such as sand may also be partially embedded in the support film instead of or in addition to the microspheres.

BRIEF DESCRIPTION OF THE DRAWINGS

The FIGURE shows a partial section view of the pavement marking sheet material of the invention.

DETAILED DESCRIPTION OF THE DRAWINGS

The drawing illustrates a sheet material of the invention 10. This sheet material, which is shown in an enlarged partial section view, includes a polymer-based sheet 11, a support film 12 adhered to one surface of the polymer-based sheet, and particulate material partially embedded in the support film. In the illustrated embodiment, the particulate material includes irregularly shaped skid-resistant particles 13 as well as transparent microspheres 14, which serve as retroreflective elements. A layer 15 of adhesive, which may be pressure-sensitive or other adhesive, is shown in dotted lines. Instead of including a layer of adhesive in the sheet material, adhesive may be applied to the sheet material and/or the roadway at the site of application.

When applied to a roadway, the sheet material of the invention deforms readily into intimate contact with the irregular pavement surface. Because of its deformability and reduced elasticity, the sheet material absorbs the energy of wheel impacts without fracture, and it avoids the stretch-return action that would tend to loosen an elastic sheet material from a roadway.

What is claimed is:

1. Pavement-marking sheet material comprising (a) a polymer-based sheet that is about one-fourth millimeter or more thick and that comprises (i) at least 8 weight-percent of an unvulcanized acrylonitrile-butadiene polymer carrying carboxyl groups in an amount of at least 2 weight-percent based on the weight of the polymer, and (ii) particulate fillers dispersed in mixture with the polymer, and (b) glass microspheres dispersed within the polymer-based sheet.

2. Pavement-marking sheet material of claim 1 which includes coupling agents at the interface between the microspheres and the polymer-based sheet, said coupling agents comprising molecules that have an inorganophilic portion and an organophilic portion.

3. Pavement-marking sheet material of claim 2 in which said coupling agent is an aminosilane.

4. Pavement-marking sheet material of claim 1 that further includes chlorinated paraffin in mixture with the acrylonitrile-butadiene polymer.

5. Pavement-marking sheet material of claim 1 which includes a thin support film adhered to one surface of the polymer-based sheet, and glass microspheres partially embedded in and partially protruding out of the support film.

6. Pavement-marking sheet material comprising (a) a polymer-based sheet that is about one-fourth millimeter or more thick and that comprises (i) at least 8 weight-percent of an unvulcanized acrylonitrile-butadiene polymer carrying carboxyl groups in an amount of at least 2 weight-percent based on the weight of the polymer, and (ii) particulate fillers dispersed in mixture with the polymer, and (b) glass microspheres partially protruding from the top surface of the sheet material.

7. Sheet material of claim 6 which includes a support film adhered to the polymer-based sheet, said layer of glass microspheres being partially embedded in and partially protruding out of the support film.

8. Pavement-marking sheet material comprising a polymer-based sheet that is about one-fourth millimeter or more thick and that comprises (i) at least 10 weight-percent of an unvulcanized acrylonitrile-butadiene polymer carrying carboxyl groups in an amount of at least 2 weight-percent based on the weight of the polymer, (ii) chlorinated paraffin, and (iii) particulate fillers and glass microspheres dispersed in mixture with the polymer, there being a coupling agent at the interface between the glass microspheres and polymer.

9. Pavement-marking sheet material of claim 8 which includes a thin support film adhered to one surface of the polymer-based sheet, and glass microspheres partially embedded in and partially protruding out of the support film.

10. A method for marking a paved surface comprising adhering to the roadway a polymer-based sheet that comprises at least 8 weight-percent of an unvulcanized acrylonitrile-butadiene polymer carrying carboxyl groups in an amount of at least 2 weight-percent based on the weight of the polymer, and particulate fillers dispersed in mixture with the polymer.

* * * * *